(No Model.)
S. STUART.
APPARATUS FOR SEPARATING OIL AND GREASE FROM STEAM.
No. 362,191. Patented May 3, 1887.
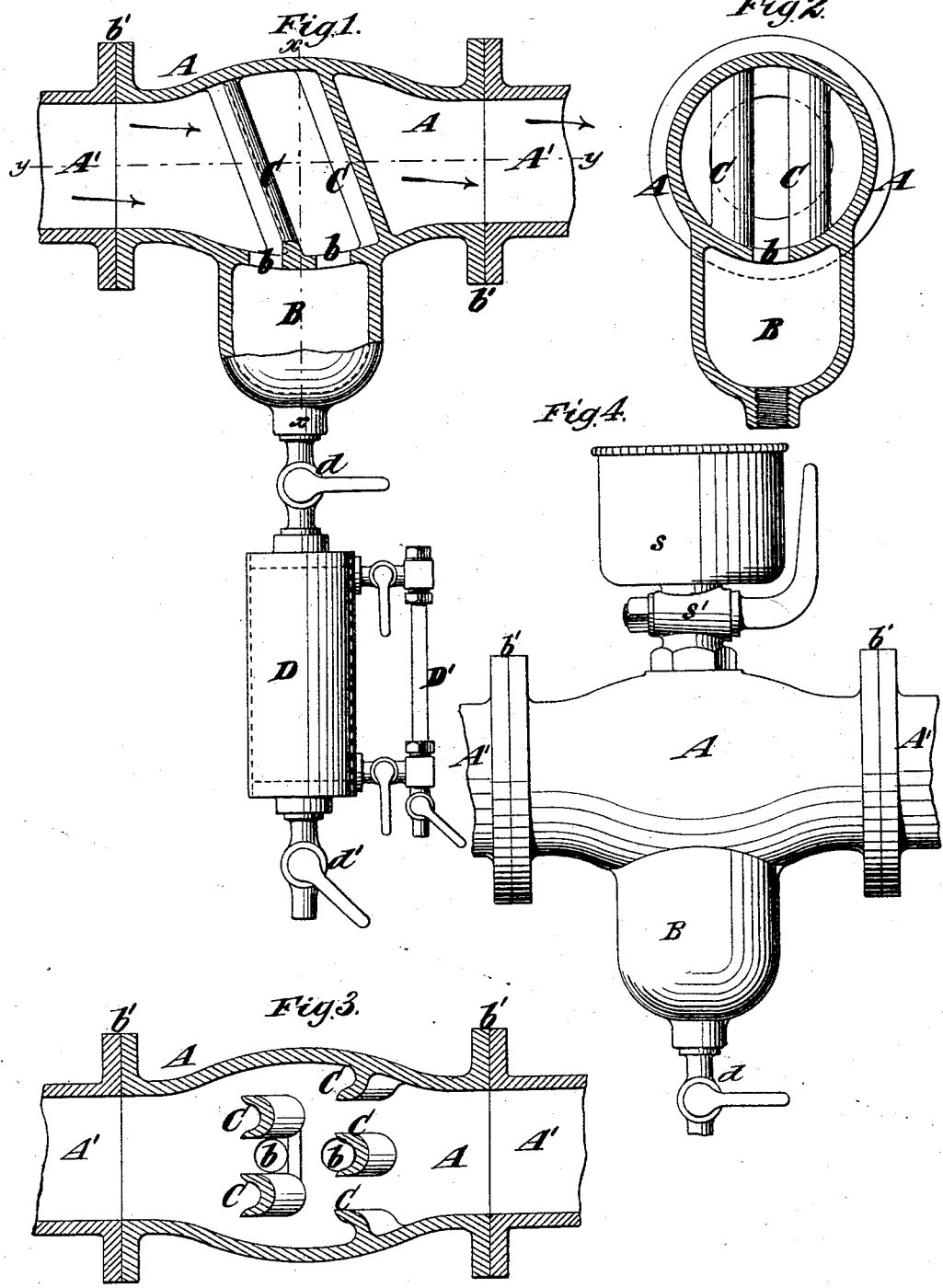
Witnesses
C. Sundgren
Emil Herter
Inventor
Sinclair Stuart
by his attys
Brown & Hall

UNITED STATES PATENT OFFICE.

SINCLAIR STUART, OF PLAINFIELD, NEW JERSEY.

APPARATUS FOR SEPARATING OIL AND GREASE FROM STEAM.

SPECIFICATION forming part of Letters Patent No. 362,191, dated May 3, 1887.

Application filed October 13, 1886. Serial No. 216,119. (No model.)

*To all whom it may concern:*

Be it known that I, SINCLAIR STUART, of Plainfield, in the county of Union and State of New Jersey, have invented a new and useful Improvement in Apparatus for Separating Oil, Grease, and Water from Steam, of which the following is a specification.

In my United States Letters Patent No. 316,673, dated April 28, 1885, I have shown and described a means of separating oil and grease from exhaust-steam, which consists of catch-plates or separating-abutments arranged within the exhaust pipe or passage of a steam-engine, and serving to deliver to the exterior of said pipe or passage the oil and grease which are separated from the exhaust-steam by their impact against the catch-plates or separating-abutments, and also any water which, by being in suspension in the steam, is intercepted by the catch-plates or separating-abutments.

My present invention relates to apparatus of this character; and the object of the invention is to provide a compact and simple apparatus which may be placed directly in a line of exhaust-pipe, and will serve to separate the oil, grease, and water from the exhaust-steam, according to the method of operation of the apparatus described in my aforesaid patent.

In buildings which are heated by steam the oil or grease which unavoidably get into the heating system of pipes is deposited in the pipes and radiators and produces a disagreeable smell throughout the building, besides tending to clog up valves and valve-seats employed in the system, and to otherwise impair the usefulness of the appliances.

According to my present invention, I combine with a casing or shell, which is adapted to be arranged directly in a line of piping, a well which communicates with the interior of the casing or shell by openings in the wall thereof, and catch-plates or separating conductors or abutments, which are arranged within the shell or casing transversely to the direction in which the steam passes through it, as particularly hereinafter described, and which serve to separate the oil and grease from the steam and deliver them into the well, from whence they are removed periodically, as desired. The shell or casing, the well, and the catch-plates or separating-abutments may, according to my invention, be formed in one integral structure. I may also arrange a vessel or receiver for containing soda or other substance upon the shell or casing, and such substance will be taken up by the steam and diffused through the pipes.

In the accompanying drawings, Figure 1 represents a sectional elevation of apparatus embodying my invention arranged within a line of piping. Fig. 2 is a transverse section upon the plane of the dotted line $x\ x$, Fig. 1. Fig. 3 is a horizontal section upon the plane of the dotted line $y\ y$, Fig. 1; and Fig. 4 is a side elevation of the shell or casing surmounted by a chemical-receiver.

Similar letters of reference designate corresponding parts in all the figures.

A designates a shell or casing, which in outward form much resembles the shell of an ordinary globe-valve, and A' designates pipe-sections, between and in the line with which the shell or casing A is arranged. The shell or casing A and the pipe-sections A' may be connected by any suitable construction of joints, flanged joints $b'$ being here represented.

At one side of the shell or casing A, and in this instance beneath the same, I have represented a well, B, which may be formed integral or in the same casting with the shell or casing A, and which has connected with it a receiver, D, for oil and grease which may drain from the well. I have here represented a cock or valve, $d$, between the well B and the receiver D, and the outlet from the receiver is controlled by a second cock or valve, $d'$.

A glass gage, D', may be arranged at the side of the receiver D, for indicating the level of oil and grease therein and enabling the attendant to draw off oil and grease from the receiver through the cock $d'$ at the proper time.

Within the shell or casing A are arranged catch-plates or separating-abutments C, and which, as here represented, are formed integral or in the same casting with the shell or casing A and well B, and which serve to intercept oil, grease, and water contained in the steam passing through the shell or casing A in the direction of the arrows in Fig. 1. As best shown in Fig. 3, these catch-plates or separating-abutments are curved or of segmental form in their transverse section, so that they will more readily retain the oil and grease which may strike against them, and will conduct the same downward to the openings $b$, through which the shell or casing A communicates with the well B. As here shown, the catch-plates or separating-abutments C are inclined from their upper ends downward and forward in the direction in which steam passes through the shell or casing A, and hence the velocity with which the oil, grease, and water are carried against the catch-plates or separating-abutments C tends to drive the oil and grease retained by them downward along the inclined surfaces toward the openings $b$.

From the above description it will be seen that my improved apparatus is very simple in its construction, is inexpensive, and when arranged within a line of piping will effectually separate all or nearly all oil and grease from the steam which passes through the line of pipe, and will also separate from the steam the greater proportion of water which may be in suspension in the steam.

In order to render the catch-plates or separating-abutments C more effective, they are arranged in staggered relation to each other in a horizontal plane, as shown in Fig. 3, and two of such catch-plates or abutments project inward from the side portions of the shell or casing A, or at their inner edge are joined to the side walls of the shell or casing.

In Fig. 4 I have represented the casing or shell A as surmounted by a vessel or receiver, $s$, which may contain soda or other chemical or substance to be diffused through the pipes by the steam. If soda be employed, it will serve to cut and remove the solid grease from the pipes. The receiver $s$ may have its communication with the casing or shell A controlled by a cock, $s'$.

What I claim as my invention, and desire to secure by Letters Patent, is—

1. The combination, with the shell or casing A to be inserted in a line of pipe, of a well, B, communicating therewith by openings $b$, and catch-plates or separating-abutments C, springing from the interior of the shell and extending transversely to the length of the passage through the shell, whereby oil, grease, and water will be separated from the steam and delivered through the openings $b$ into the well, substantially as herein described.

2. The combination, with the shell or casing A to be inserted in a line of pipe, of the well B at the bottom thereof and communicating therewith by openings $b$, and the catch-plates or separating-abutments C, extending transversely across the shell from side to side thereof and formed integral with the shell, substantially as herein described.

3. The combination, with the shell or casing containing the catch-plates or separating-abutments C and the well B, connected therewith, of the chemical-receiver $s$, communicating with the said shell or casing, substantially as and for the purpose herein set forth.

SINCLAIR STUART.

Witnesses:
C. HALL,
FREDK. HAYNES.